(12) United States Patent
Gajewski et al.

(10) Patent No.: US 7,331,368 B2
(45) Date of Patent: Feb. 19, 2008

(54) DEVICE FOR GLUING TOGETHER TWO WEBS OF PACKAGING MATERIAL

(75) Inventors: Matthias Gajewski, Guckingen (DE); Matthias Moller, Ronneburg (DE); Ferdinand Scheu, Runkel (DE); Klaus Specht, Darmstadt (DE); Michael Heun, Runkel-Dehm (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 442 days.

(21) Appl. No.: 10/517,233

(22) PCT Filed: Nov. 6, 2003

(86) PCT No.: PCT/EP03/05959

§ 371 (c)(1),
(2), (4) Date: Dec. 29, 2004

(87) PCT Pub. No.: WO03/106315

PCT Pub. Date: Dec. 24, 2003

(65) Prior Publication Data

US 2005/0167053 A1    Aug. 4, 2005

(30) Foreign Application Priority Data

Jun. 13, 2002   (DE) ................. 102 26 148

(51) Int. Cl.
*B29C 65/74*  (2006.01)
*B32B 37/00*  (2006.01)
*B32B 38/04*  (2006.01)

(52) U.S. Cl. ..................................... 156/515

(58) Field of Classification Search ............... 156/159, 156/157, 304.6, 73.4, 505, 304.3, 304.5, 156/73.3, 510, 512, 515, 517, 518
See application file for complete search history.

(56) References Cited

U.S. PATENT DOCUMENTS 2,606,136 A * 8/1952 Garrett et al. ............... 156/504

(Continued)

FOREIGN PATENT DOCUMENTS

DE    2 235 281    7/1972

(Continued)

*Primary Examiner*—Philip Tucker
*Assistant Examiner*—Sing P. Chan
(74) *Attorney, Agent, or Firm*—Paul & Paul

(57) ABSTRACT

Described is an apparatus for glueing two webs (3, 4) of packaging material for the production of liquid-tight packs, wherein each web (3, 4) is covered at least at one side with a liquid-tight adhesive layer (58, 65) which can be activated by heat, comprising
  clamping means (5, 21, 27) for clamping the material webs (3, 4) fast,
  a cutting unit (11) for applying an inclined cut (16) extending substantially transversely with respect to the material web (3, 4), and
  a welding unit (30) for applying heat and pressure for glueing the material webs (3, 4) along the adhesive strip (29).

Figure 3:
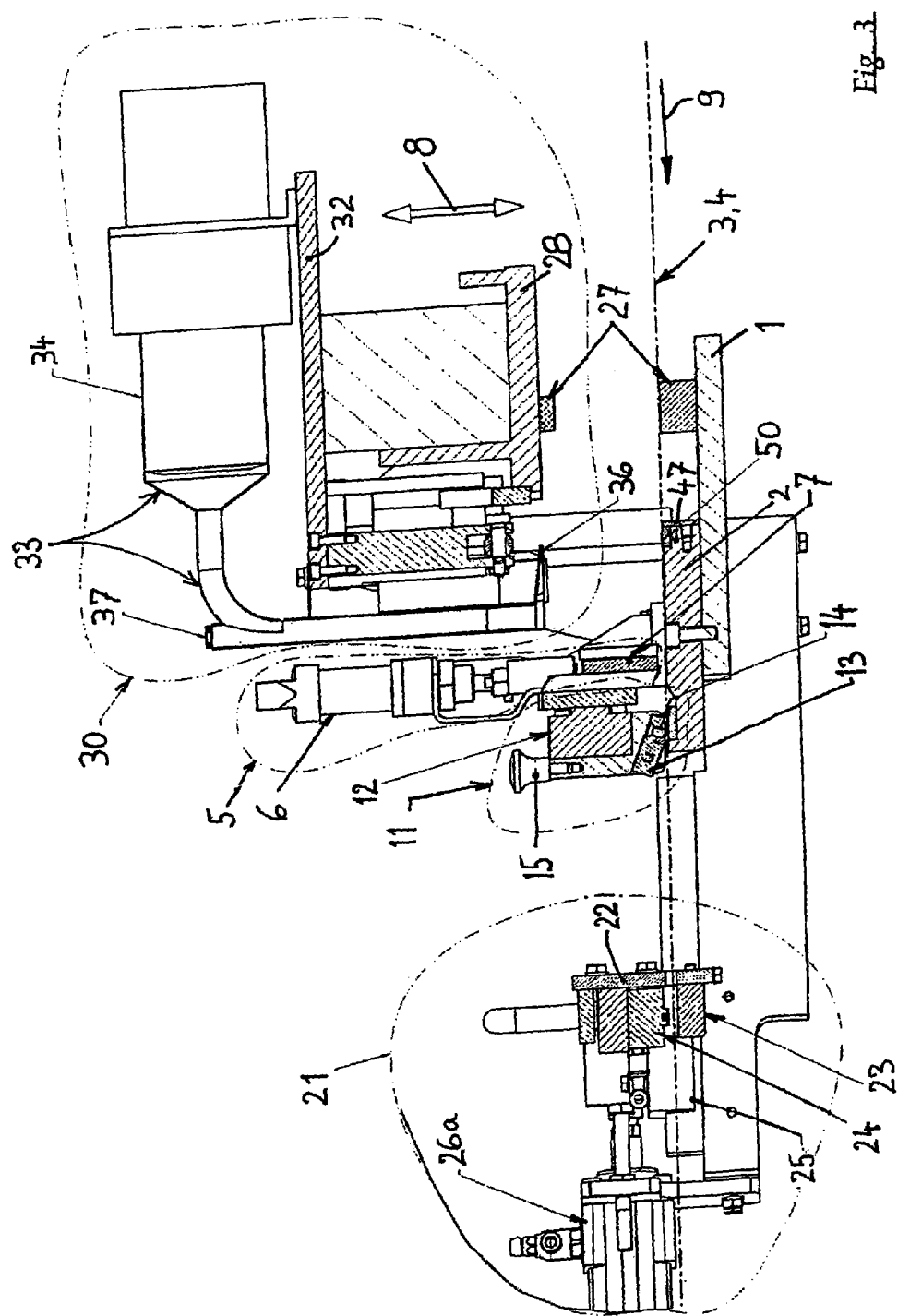

In order when changing an empty roll to a new full roll at the factory to provide the material web with a factory adhesive location of adequate quality which ensures a higher and more reliable level of liquid-tight sealing integrity, it is provided in accordance with the invention that the welding unit (30) has a slider (31) which is displaceable along a transverse rail (28) substantially transversely with respect to the direction of travel (9) of the material web (3, 4) and on which are arranged a heating means (33) and therebehind in the direction of displacement (20) a pressure roller (38).

12 Claims, 6 Drawing Sheets

U.S. PATENT DOCUMENTS

| | | | |
|---|---|---|---|
| 3,510,625 A | | 5/1970 | Wheeler et al. |
| 3,556,912 A | * | 1/1971 | Burgo et a. ............... 156/580.1 |
| 3,657,033 A | * | 4/1972 | Sager ........................ 156/73.3 |
| 3,687,786 A | * | 8/1972 | Williams .................... 156/502 |
| 3,957,567 A | * | 5/1976 | Pursell et al. ............... 156/505 |
| 4,120,739 A | | 10/1978 | Peeters et al. |
| 4,681,646 A | * | 7/1987 | Pinto et al. ................. 156/157 |
| 5,618,377 A | | 4/1997 | Kaneko et al. |
| 5,746,101 A | * | 5/1998 | Benzing et al. ................ 83/34 |
| 6,079,470 A | | 6/2000 | Pielke et al. |
| 6,342,118 B1 | | 1/2002 | Ward |
| 2002/0088525 A1 | * | 7/2002 | Jahn et al. ................. 156/73.1 |
| 2004/0074590 A1 | | 4/2004 | Canti et al. |

FOREIGN PATENT DOCUMENTS

| | | |
|---|---|---|
| DE | 692 10 611 T2 | 2/1993 |
| EP | 0 181 280 | 5/1986 |

* cited by examiner

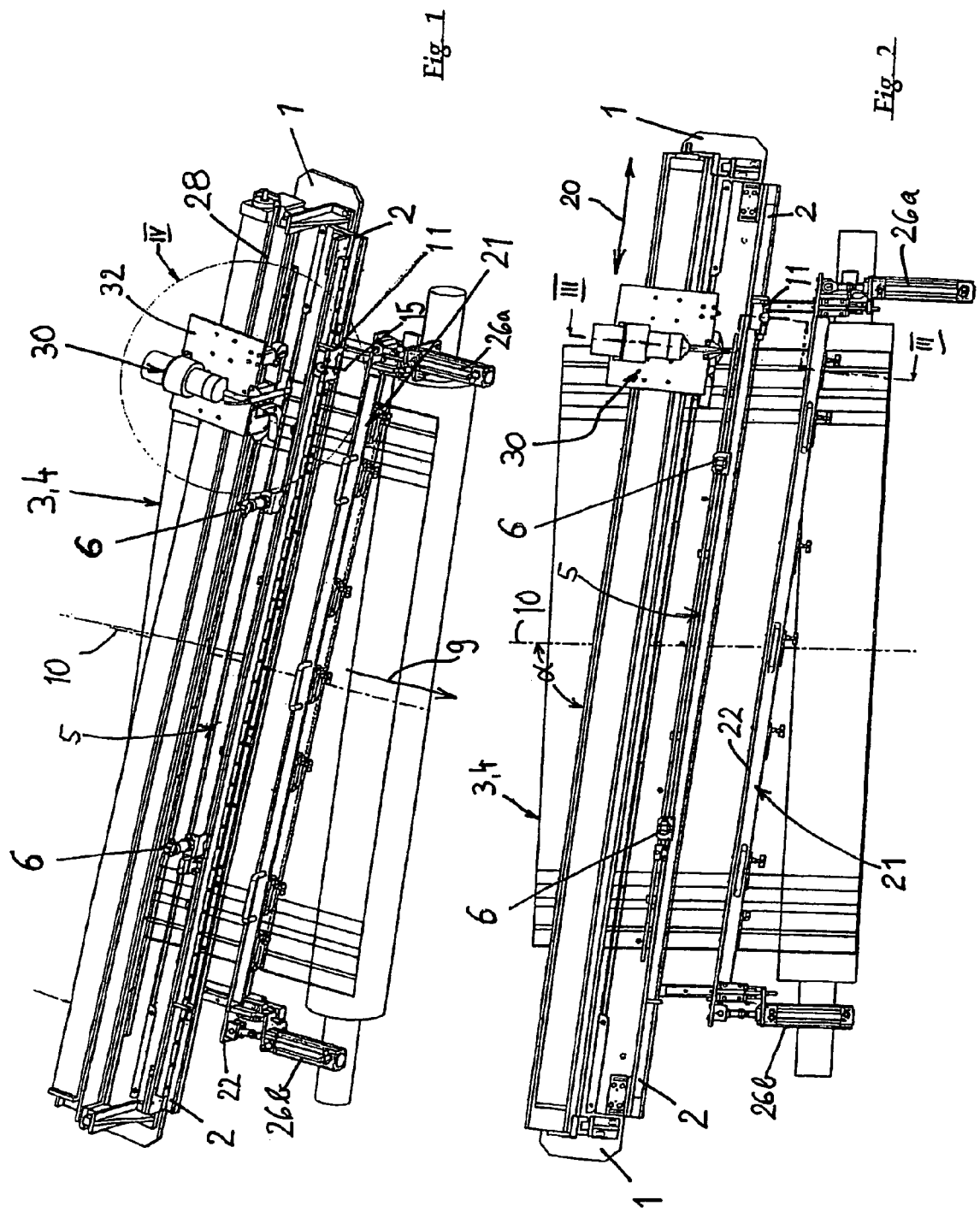

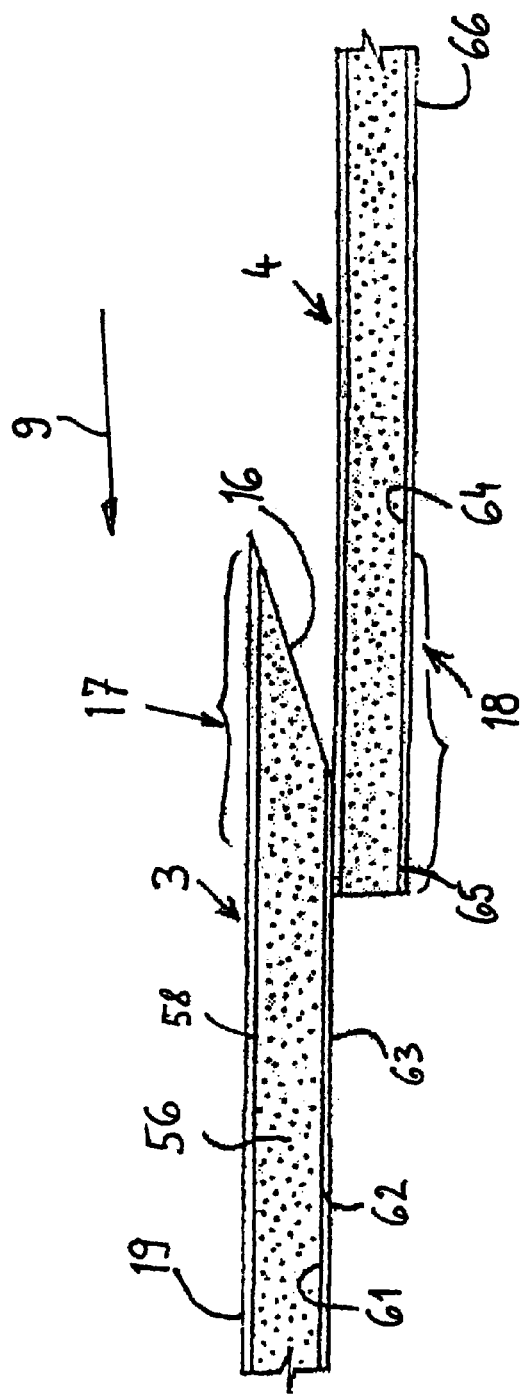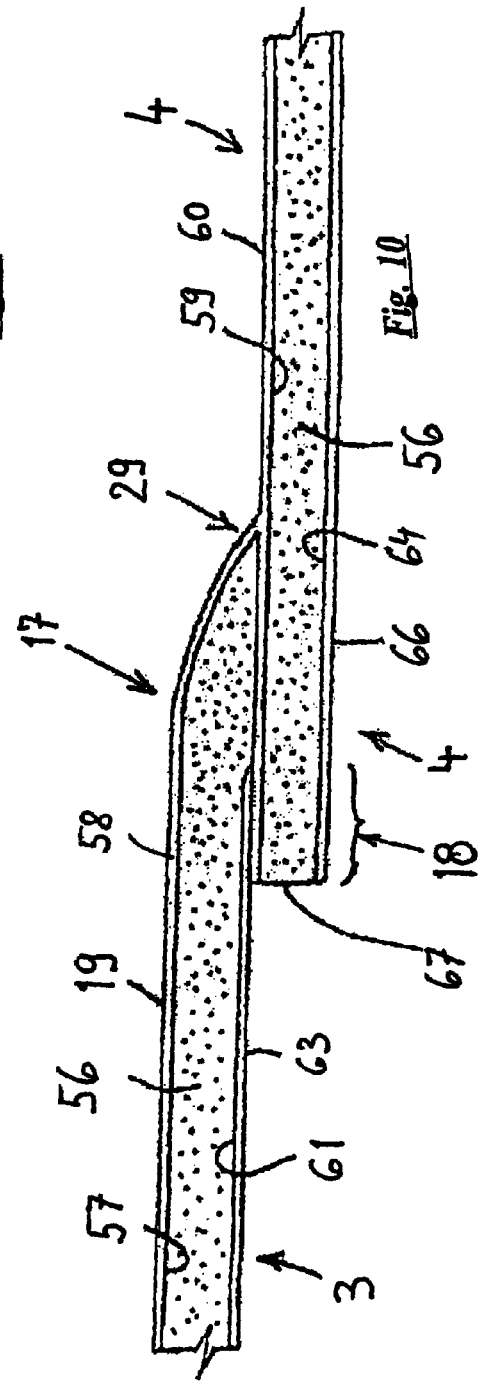

DEVICE FOR GLUING TOGETHER TWO WEBS OF PACKAGING MATERIAL

The invention concerns an apparatus for glueing two webs of packaging material for the production of liquid-tight packs, in particular for liquid foods, wherein each web is covered at least at one side with a liquid-tight adhesive layer which can be activated by heat, comprising clamping means for clamping the material webs fast, a cutting unit for applying an inclined cut extending substantially transversely with respect to the material web, and a welding unit for applying heat and pressure for glueing the material webs along an adhesive strip.

Packs for liquid foods, for example juices or milk, are known, comprising plastic-coated paper, cardboard or generally a coated fibre layer. Such packs are produced in known filling machines from individual rolls from which the respective material web is drawn. Such individual rolls comprise a wound material web which is previously embossed, stamped, laminated and so forth. The filling machine continuously produces the liquid packs, with the material web being continuously withdrawn from the individual roll. When the individual roll is exhausted, a reserve roll must be in readiness in good time and the trailing edge of the 'old' material web of the exhausted individual roll must be joined to the pre-prepared leading edge of the new individual roll. That method of joining the two material webs is also referred to as 'splicing'.

In regard to processing individual rolls in filling machines, it is also known that a cut, open edge of the fibre layer, for example the paper layer, leads to swelling and a loss of sealing integrity upon coming into contact with the packaged liquid.

Therefore EP-A-00 118 863.0 already discloses a method of providing one of the two transverse edges of the material webs with an inclined cut and then, with the acutely terminating edge of the material web being bent over, glueing it in such a way that a liquid-tight weld is provided on the product side. In that way the originally open surface of the fibre layer is covered by plastic material and liquid-tightly welded.

In the case of the individual rolls which are processed in filling machines, heat and pressure can be applied simultaneously over the complete width of the material web by clamping a first bar against a second one, so that, in combination with the inclined cut, it is possible to produce liquid-tight packs.

The individual rolls are produced by cutting machines which make it possible to cut the desired number of individual rolls from a large wide master roll, after the laminating, printing, coating and so forth steps.

The problem of the wide material web and thus exhaustion of the first roll is known. It was however hitherto difficult if not impossible for the trailing edge of a wide master roll to be glued to the leading transverse edge of the reserve master roll, for, by virtue of the width of for example 1.6 m of a master roll, it was not possible for pressure and heat to be applied in the correct amount and at the right time to the complete width of the transverse edge of a material web in such a way that it was possible to produce an adhesive join of good quality and with good liquid-tight sealing integrity.

Therefore the object of the present invention is, when changing an empty roll for a new full roll, at the factory, to provide the material web with a factory adhesive location of adequate quality which ensures a higher and more reliable level of liquid-tight sealing integrity, wherein preferably a cut is made in the material web at the same time after producing the adhesive strip.

According to the invention that object is attained in that the welding unit has a slider which is displaceable along a transverse rail substantially transversely with respect to the direction of travel of the material web and on which are arranged a heating means and therebehind in the direction of displacement a pressure roller.

The apparatus according to the invention involves glueing two webs of packaging material, the transverse edges of which are to be connected together in the so-called splicing method, for example welded or spliced. The packaging material is a laminated or composite material. Generally and in a particularly advantageous feature the glueing apparatus according to the invention can be used on a paper material coated at least on one side with plastic material. Liquid-tight packs are produced therefrom in known manner. At least the surface of the packaging material, which faces towards the liquid product, must be provided and covered with a liquid-tight layer. If this is an adhesive layer activatable by heat, such as for example an adhesive substance or a plastic material, for example polyethylene, then an adhesive effect is achieved by virtue of the action of heat and pressure. That adhesive effect is produced in the fashion of a kind of weld. So that the trailing edge of the 'old' material web, that is to say the first material web, comes to lie in the correct position relative to the leading, pre-prepared transverse edge of the 'new' or second material web, in the correct or decorative position, suitable clamping means must be provided. The transverse edges are held and brought into the correct position relative to each other by the clamping means in order thereafter to cause the welding unit to operate.

If, as in many known methods, a fibre layer or paper layer is cut perpendicularly with respect to the surface of the material web, then in most cases the plastic coating is not sufficient, even in the case of a composite material, in order to allow a sufficient amount of plastic material to flow out under the effect of heat, to close the open cut edge. Therefore, the inclined cut which has already been described in the opening part of this specification was produced, the face of which includes an angle of 10 to 40°, preferably 20°, relative to the surface of the material web.

It is now possible for the first time by virtue of the invention to provide an apparatus with which it is possible by welding to produce an adhesive strip, even when dealing with relatively wide material webs, that is to say a so-called factory adhesive location, in which respect it is assumed that the master roll which is processed at the factory is of a width of for example 1.6 m. In accordance with the invention there is provided a slider which is displaceable substantially transversely with respect to the direction of travel of the material web, and disposed on that slider is a heating means and a pressure roller. Therefore, when producing the factory adhesive location, the through movement of the material web is stopped for a short time and the slider is moved substantially transversely with respect to the direction of travel of the material web from one longitudinal edge thereof to the other, in such a way that the heating means produces heat activation of the packaging material at the correct location over the entire width of the web and immediately thereafter the pressure roller provides that the transverse edges of the packaging material, which are to be closed, are pressed against each other. It is then possible in that way to produce a factory adhesive location, even when dealing with a wide material web. The quality of that adhesive location is excellent and guarantees reliable liquid-tight sealing integrity.

If, in a further advantageous configuration of the invention, a cutting blade is arranged on the slider on the side opposite to the pressure roller with respect to the heating means, it is possible to produce a cut in the material web at the same time after production of the adhesive strip. By virtue thereof, it is possible for example to cut off the non-glued overlapping end region, beside the adhesive strip. In that way for example when dealing with the new material web which is drawn off the full new master roll, it is possible for the preparatory cut to be produced as desired only once by hand because the operation of exactly cutting it off is effected immediately after the welding operation by the cutting blade. That is preferably a rotating cutting blade. It can be mounted rotatably on the displaceable slider in a simple and precise manner and provides for precise guidance of the cut in relation to the adhesive strip.

It is particularly desirable in that respect if, in accordance with the invention, arranged beside the pressure roller on the slider is a guide element for lifting the material web along the transverse edge thereof during the displacement of the slider. The guide element acts like a wedge and lifts the material web to be glued by some millimeters in such a way that the heating means can apply the heat necessary for softening the plastic material and for welding it precisely to the regions of the later adhesive strip. While the guide element lifts the material web somewhat at its transverse edge to be glued, the pressure roller, after application of the heat, presses the two material webs together so that the desired adhesive strip can be produced.

The heat can be applied in a particularly simple manner if, in accordance with the invention, the heating means has a hot air element, a transfer tube and a hot air nozzle, preferably in the form of a wide-slot nozzle. The hot air element which is available on the market can produce hot air and blow it in a blower-like fashion into the above-mentioned transfer tube which supplies the hot air nozzle with the hot air in such a way that a jet of hot air issues from the nozzle and can impinge on the surfaces, which are appropriately arranged, of the material webs.

It is also desirable according to the invention if the welding unit and the transverse rail can be raised and lowered in the lifting direction substantially perpendicularly to the direction of travel of the material web and the direction of displacement of the slider. Taking the direction of travel of the material webs as a datum, then the transverse rail extends and the welding unit is displaced substantially perpendicularly with respect to that direction of travel, in which respect deviations of up to 30% are possible. The terms 'perpendicular' and 'transverse' are to be interpreted in that sense. In a direction of viewing perpendicularly on to a material web which is guided straight, it can be easily imagined that it extends for example from above downwardly (direction of travel) so that the transverse rail consequently extends transversely with respect thereto from right to left or vice-versa and the welding unit is displaceable by way of the slider in parallel relationship with the transverse rail, that is to say substantially transversely with respect to the direction of travel of the material web. The welding unit with the transverse rail can now also be raised and lowered in the third direction perpendicularly to the two directions just described above. In the example just considered the lifting direction would be in the direction of view, or in opposite relationship thereto.

The advantage of this structure is that the material webs can be prepared and positioned correctly relative to each other in their welding position or decorative position, and it is only thereafter that the welding unit is set in operation. The term welding is used here to denote heating and pressing together, so that the softened plastic material is intimately mixed by the pressure so that a welding effect is produced. After positioning of the material webs the welding unit can then be moved downwardly and set at the correct position so that the heat actually goes to the correct, desired locations for the adhesive strip. Equally the welding unit, after production of the adhesive strip, can be raised out of the operative position again and returned to the initial or zero position.

If, in a further advantageous configuration of the invention, fixed below the transverse rail is a first clamping bar and at a spacing therebeneath a second clamping bar the lifting movement of the welding unit with the transverse rail can also be used at the same time to clamp fast the previously positioned material web and only then to form the adhesive strip. In the lifted condition the welding unit is further away from the material web than in the lowered condition. Then, the spacing between the first clamping bar and the second clamping bar arranged therebeneath is at the greatest. When the welding unit has been lowered then that spacing is reduced, the spacing at the minimum being so small that only the thickness of the material web has space therebetween. In the minimum case that spacing is then therefore equal to the thickness of the material web.

It is further advantageous in accordance with the invention if the pressure, when producing the adhesive strip, is produced by the pressure roller and a rubber pressure member mounted opposite thereto, wherein the rubber pressure member is in the form of a bar which extends parallel to the transverse rail and which has roof-like inclined surfaces. The pressure roller can be produced from material of varying hardness. It has however proven to be advantageous for the pressure roller to be caused to operate against a rubber pressure member because that provides for best compensation for very small unevenness in the material web, by virtue of tolerances. Nonetheless the rubber pressure member must be of adequate hardness that its external profile with the inclined surfaces is also not substantially altered in operation. A particularly preferred Shore hardness is 86°. If the cross-sectional area of the rubber pressure member which is of an elongate configuration is considered then the outermost contact edge of the two inclined surfaces is eccentric in such a way that the one inclined surface is smaller than the other.

In a preferred embodiment of a rubber pressure member of a width of about 12 mm, in a projection the width of the one inclined surface is for example 10 mm and that of the other inclined surface is only 2 mm.

The arrangement of the pressure roller on the one hand and the rubber pressure member on the other hand is so selected that, according to the invention, the contact line of the pressure roller against the rubber pressure member is on an inclined surface. While earlier it has in part been thought that the best pressure effect is achieved when the pressure roller comes to apply pressure to the highest line, that is to say the contact line of the two inclined surfaces, in accordance with the invention different factors were found to be better. In a particularly preferred embodiment it was found that the outermost edge of the material web which is cut at an inclination should be arranged and held at a spacing of about 2 mm from the contact line of the two inclined surfaces in order to achieve the best adhesive strip. Therefore the action of the pressure roller has been displaced from the highest location, the contact line of the two inclined surfaces, outwardly in a direction towards the larger inclined surface. By virtue of the new glueing apparatus according to the invention, not only is it possible to provide a clean cut, but in addition there are no longer any problems with the plastic material, for example the polyethylene, at the material edges. In addition it is extremely practical if the pressure required for producing the adhesive strip can be produced by a comparatively small pressure roller which can be fixed to the slider. Preferably the material of the pressure roller is Teflon.

It is further advantageous if in accordance with the invention the clamping means for clamping the material webs fast have a front, a central and a rear clamping device, arranged in the direction of travel of the material web. In that way it is possible for the transverse edge of the one material web to be positioned exactly in relation to that of the other material web and for the various working steps to be carried out precisely and at the correct time.

In the production of liquid packs, problems already always occurred if a weld seam had to be applied over a different number of material webs. Thus it is possible easily to envisage a mutually superposed longitudinal weld seam. If that longitudinal weld seam is to be crossed by a transverse weld seam, then there are four layers of material at the location where the two weld seams cross, whereas therebeside there are only two material layers. That differing number of web layers at the individual locations resulted in leaks. In order in accordance with the invention also to provide measures in the production of the adhesive strip, the new glueing apparatus is further characterised in that the transverse rail of the welding unit and the clamping bars and clamping beams of the welding unit, which extend parallel to the transverse rail, are set at an angle ($\alpha$) relative to the direction of travel of the material webs of 60° to 100°, preferably 70° to 90° and particularly preferably 85°. If the adhesive line is produced with an apparatus having those features, it extends at the above-mentioned angle $\alpha$ relative to the direction of travel of the material webs. The non-expert observer could think that the above-mentioned transverse rail and the elongate clamping means are set at an angle of 90° relative to the direction of travel of the material webs. Then, the desired adhesive strip between the two material webs would also be at 90° relative to the direction of travel thereof. By virtue of the measures according to the invention however the new adhesive strip extends set at an angle $\alpha$ relative to the direction of travel. In this case consideration is given to that angle $\alpha$ which, in the direction of view perpendicularly on to the material web which extends straight, is for example to the left of the direction of travel. When viewing the situation in that way the transverse rail with the other parallel parts extends slightly from top left towards bottom right, for which reason the angle $\alpha$ at the left is less than 90°. An adhesive line which extends inclinedly in that way considerably facilitates the production of a pack, namely if longitudinal seams cross that new adhesive strip. In addition a pack produced in that way enjoys substantially better strength. An adhesive strip produced in that way is stronger. The material with such an adhesive strip slips better over the various guide locations, for example constrictions in the product-guiding region, such as for example the pressure flange on the filling tube.

The above-mentioned cutting unit which is intended to produce the inclined cut along the transverse edge of the material web then extends at the above-mentioned angle $\alpha$. The cutting unit can also carry a blade which is fixed on a carriage which is drawn to and fro over the width of the material web when it is stationary. In that way the inclined cut can be very precisely applied at exactly the correct position of the material web, even if the latter, as drawn from a master roll, is of a considerable width of for example 1.6 m.

Because the new adhesive strip can be extremely strongly produced with the glueing apparatus according to the invention, it is possible to produce aseptic packs without having to have considerations in regard to leaks.

Figure 4:
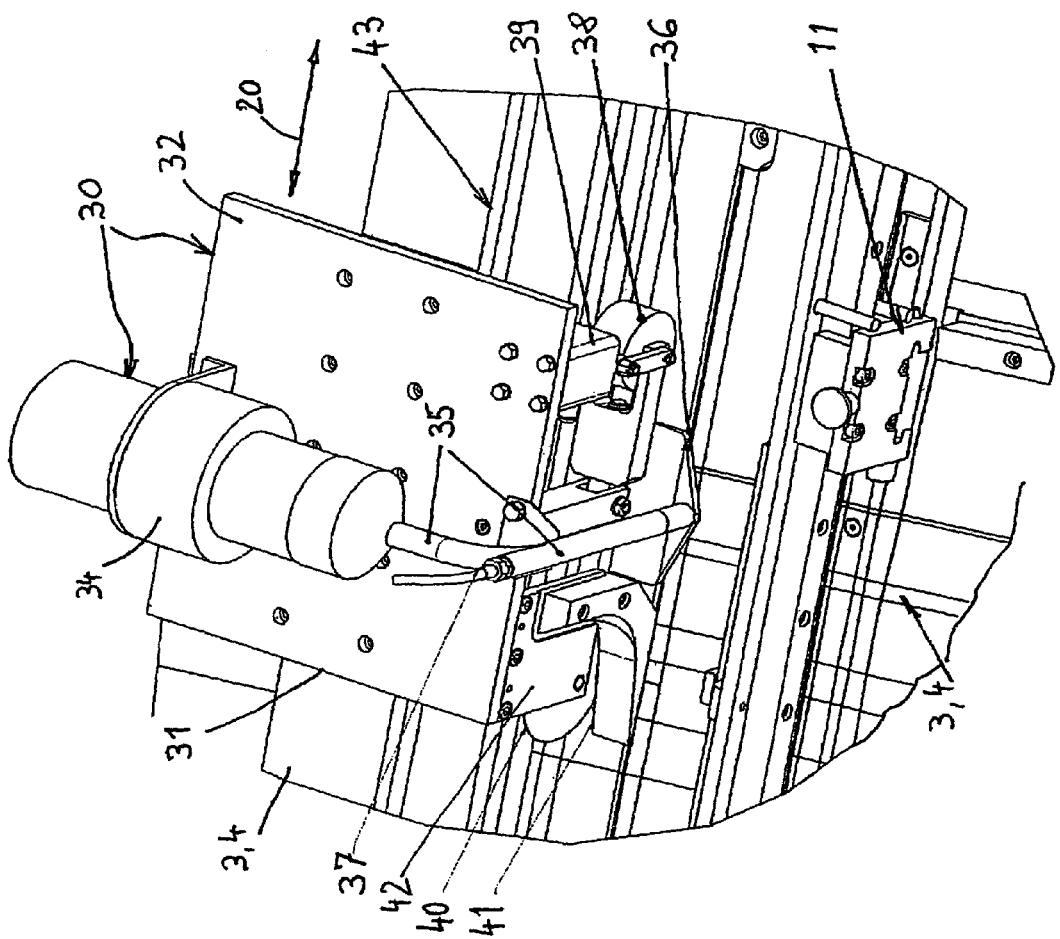
Figure 5:
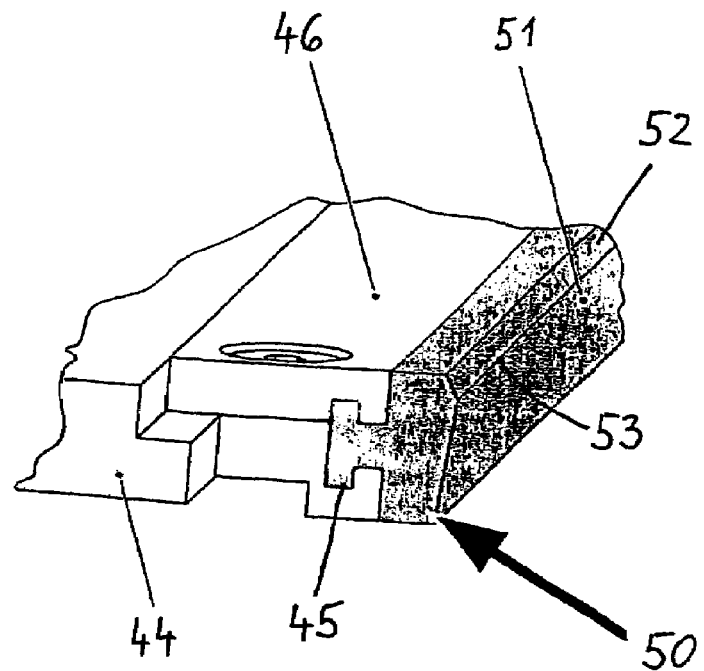
Figure 6:
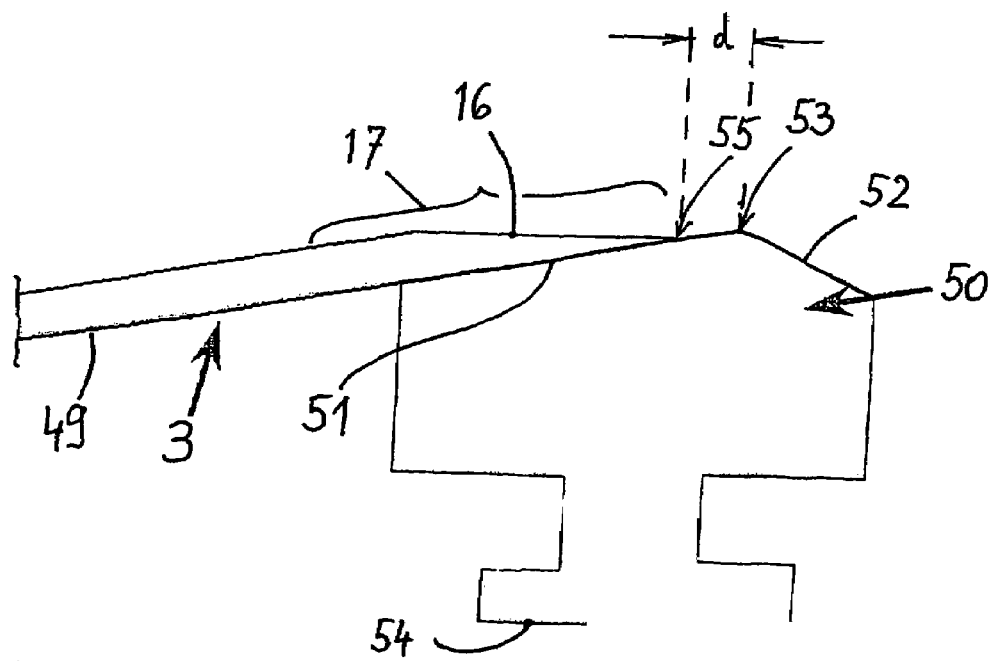
Figure 7:
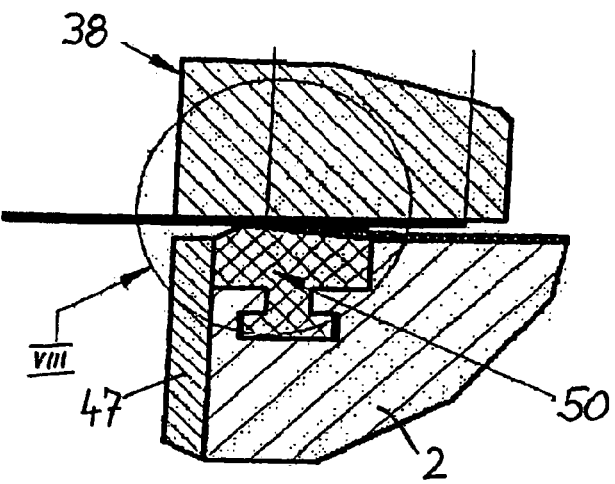
Figure 8:
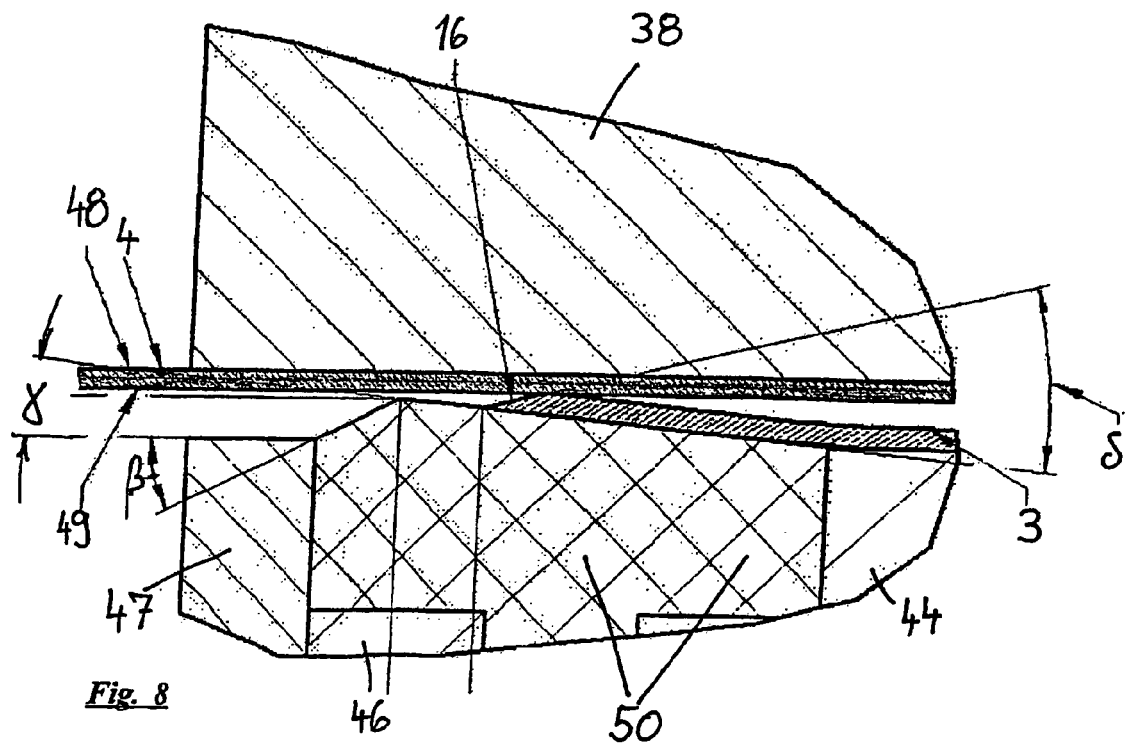

Further advantages, features and possible uses of the present invention will be apparent from the description hereinafter of preferred embodiments with reference to the accompanying drawings in which:

FIG. 1 is a perspective plan view of a part of a refinement machine for material webs from a guide cylinder at the bottom as far as a transverse rail at the top, FIG. 2 shows the same view as in FIG. 1, in which respect it will be noted however that the view is perpendicularly directed on to the material web which is being guided flat, FIG. 3 is a view in section taken along dash-dotted line III-III in FIG. 2 at the right, FIG. 4 is a broken-away perspective view of a detail IV corresponding to the circle in FIG. 3 at the right, FIG. 5 is a broken-away perspective view of a part of a special bar-shaped rubber pressure member showing in greater detail the base plate which is composed of a pressure bar and an upper fixing rail, FIG. 6 an enlarged diagrammatic view in cross-section of the rubber pressure member with the end, applied to an inclined surface, of the material web which is provided with the inclined cut, FIG. 7 shows a broken-away view of the operating condition when the pressure roller presses against the rubber pressure member with material webs disposed therebetween, FIG. 8 shows a broken-away view on an enlarged scale of the detail indicated by the arrow VIII in FIG. 7, FIG. 9 is a broken-away diagrammatic cross-sectional view taken along the longitudinal centre line of two material webs which are prepared for the glueing operation and correctly positioned against each other, and FIG. 10 shows a similar view to FIG. 9 in which however the welding operation is concluded and the liquid-tight nature of the upper plastic layer, at the product side, is illustrated.

As shown in FIGS. 1 to 3, fixed on an elongate carrier plate 1 which extends substantially over the entire width of the refining machine and thus also over the width of the material webs 3 and 4 is a base plate 2 of almost equal length, on which is fixed a clamping device with respective mutually spaced cylinders 6 for pressing against the clamping device 5. In FIG. 3 the clamping device 5 is enclosed by a dash-dotted line. Here, this involves a so-called central clamping device 5 which by way of a clamping cylinder 6 can lift a clamping bar 7 upwardly in the lifting direction 8 away from the base plate 2 or move it theretowards. The lifting direction 8 is illustrated in FIG. 3 by the white double-headed arrow at the right. That direction is perpendicular to the material webs 3 and 4 which are transported flat at the height of the surface of the base plate 2 in the direction of travel 9. In FIG. 2 the lifting direction 8 would be the viewing direction or in opposite relationship to the view. The dash-dotted line 10 in FIGS. 1 and 2 is the longitudinal centre line through the material webs 3 and 4, which is also parallel to the direction of travel 9 thereof.

Arranged downstream of the clamping device 5 in the direction of travel (and laterally displaced, as can be seen from FIGS. 1 and 2), is a cutting unit 11 which in the sectional view in FIG. 3 is again enclosed by a dash-dotted line. That cutting unit 11 is movable substantially (somewhat less) over the length of the clamping bar 7 transversely over the material webs 3 and 4 by means of a guide carriage with guide rail, indicated overall by reference 12. Mounted on the guide carriage 12 is a blade holder 13 from which projects a blade 14 with two cutting edges. The knob 15 which is mounted at the top makes it possible to grip the guide carriage with rail 12 in order to produce an inclined cut 16 which extends substantially transversely with respect to the material web 3 or 4.

The inclined cut 16 can also be particularly clearly seen in the diagrammatic representation of the material webs 3 and 4 shown in FIGS. 6 and 9. The old, outgoing material web 3 comes from the right as indicated by the direction of travel 9 in FIG. 3 and moves towards the left (as shown in FIGS. 1 and 2 downwardly). Before being joined with the glueing apparatus the trailing transverse edge 17 of the leading, first 'old' material web 3 firstly receives the inclined cut 16 before the leading transverse edge 18 of the new, rear, advancing material web 4 is laid into the welding or decorative position shown in FIG. 9.

In the illustrated embodiment in particular in FIGS. 6 and 9 the angle of the inclined cut 16 on the one hand and the inner surface 19 of the front, outgoing material web 3 on the other hand is about 20° (FIGS. 6 and 9). The inclined cut 16 extends over the entire width of the material web 3 and 4 respectively in a direction 20 substantially perpendicularly to the direction of travel 9 or the longitudinal centre line 10 of the material web. The specified direction 20 is only 'substantially' or approximately transverse with respect to the longitudinal centre line 10 of the material web 3, 4 because the clamping bar 7, like also other means still to be described, in the embodiment illustrated here, do not extend exactly transversely with respect to the longitudinal centre line 10, but are set at an angle α which, as shown in the view in FIG. 2, is measured to the left of the longitudinal centre line 10 and is therefore less than 100°, more specifically in the range of 60° to 100°, preferably 70° to 90°, and is quite particularly preferably 85°.

Further forwardly in the direction of travel 9 of the material webs 3 and 4, further downwardly in the view in FIGS. 1 and 2 and further to the left in the view in FIG. 3, is disposed the clamping and positioning unit 21 generally identified by reference 21. This is again enclosed in FIG. 3 by the dash-dotted line. The clamping and positioning unit 21 includes one of seven items of clamping cylinders 24 secured to an elongate holding bar 22. Disposed at a spacing below the clamping cylinder 24, as measured perpendicularly to the plane of the material web 3, 4, on the holding bar 22, there is also a clamping beam 23. A guide carriage and guide rail generally identified by reference 25 also belongs to the clamping and positioning unit 21. By means thereof, the holding bar 22 which extends in the above-described direction 20, hereinafter referred to as the direction of displacement 20, towards both sides far over the width of the material web 3 and 4 respectively, can be displaced in and in opposite relationship to the direction of travel 9 of the material webs. In the forward movement in opposite relationship to the direction of travel 9 of the material webs therefore the spacing between the base plate 2 and the elongate holding bar 22 is reduced. The drive for that movement is provided by two displacement cylinders 26a and 26b. The piston rods thereof can be so controlled that the setting angle α of the elongate holding bar 22 relative to the longitudinal centre line 10 of the material web remains unchanged. The material web 3 which lies over the clamping beam 23 can be clamped fast with the clamping cylinder 24. This clamping and positioning unit 21 is the front clamping device as viewed in the direction of travel 9 of the material web 3, 4—in contrast to the central clamping device 5.

In addition however upstream thereof, that is to say shown at the right in FIG. 3, there are also rear clamping bars 27 which thus form the so-called rear clamping device 27. The material web passes over the lower clamping bar 27 thereof and can be clamped fast by virtue of the spacing relative to the upper clamping bar 27 being reduced by displacement in the lifting direction 8. The upper clamping bar 27 can therefore be displaced downwardly in the direction 8 on to the lower clamping bar 27.

The upper clamping bar 27 is fixed at the bottom to a transverse rail 28. It in turn extends far over both sides of the width of the material web and thus crosses the material webs in practice like the carrier plate 7. The transverse rail 28 is disposed parallel to all the elongate elements such as the carriage plate 1, the base plate 2, the clamping bar 7, the guide rail 12, the elongate holding bar 22 and so forth. If the setting angle α between the elements which transversely extend across the material webs is approximately taken as being about 90°, then the transverse rail 28 also extends approximately transversely with respect to the direction of travel 9 of the material webs 3 and 4.

That transverse rail 28 belongs to a welding unit 30 which can be clearly seen in FIGS. 1 to 3 and as a perspective view in FIG. 4. Once again the parts belonging to the welding unit 30 are enclosed by the closed, dash-dotted line in FIG. 3 (welding unit 30).

The glueing apparatus according to the invention involves the production of an adhesive strip which is produced by glueing of the two material webs 3 and 4 as shown in FIG. 10 in the region of the arrow 29 by the application of heat and pressure. That adhesive strip 29 extends over the entire transverse edge 17 of the outgoing material web 3 and the leading transverse edge 18 of the rear advancing material web 4. If more specifically the feed roll for the old, leading, outgoing material web 3 is exhausted or has run empty and the rear, trailing transverse edge 17 approaches the region of the glueing apparatus in accordance with the direction of travel 9, then the machine has to be stopped and the full reserve roll with the new, rear, incoming material 4 has to be threaded in. Both material webs 3 and 4 have to be joined together by the glueing apparatus. That joining or glueing operation is also internationally referred to as 'splicing'. For that purpose firstly the possibly roughly torn-off respective transverse edge 17 or 18 has to be correctly positioned relative to the respective other transverse edge and cut off, in which case thereafter or in the course of the cutting operation the two transverse edges 17 and 18 are welded to each other, forming the above-mentioned adhesive strip 29. All clamping devices can then be opened and the two webs of material, being the old leading web 3 and the new trailing web 4, can be advanced in the direction of travel 9.

The welding unit which is generally identified by reference 30 also includes the above-mentioned transverse bar 28. A slider 31 is displaceable along the transverse bar 28 transversely over the material webs 3 and 4 and transversely with respect to the direction of travel 9 thereof, in the above-mentioned direction of displacement 20. The slider 31 includes a support plate 32 on which are mounted a heating means 33 with a hot air element 34, a transfer tube 35 and a hot air nozzle 36. The temperature of the hot air flowing into the hot air nozzle 36 in the form of a wide-slot nozzle can be measured by way of the temperature sensor 37 mounted on the transfer tube 35 at the top thereof.

The entire welding unit 30 with slider 31 and transverse rail 28 can be raised and lowered in the lifting direction 8 perpendicularly to the direction of displacement 20 of the slider 31. By virtue of a lowering movement, the spacing between the first clamping bar 27 fixed under the transverse rail 28 and the clamping bar 27 fixed on the carrier plate 1 beneath same can be reduced to zero. FIG. 3 shows that condition in which the upper clamping bar 27 with transverse rail 28 and slider 31 has been moved upwardly in the direction 8.

As is particularly clearly shown in FIG. 4, a pressure roller 38 is rotatably pivoted to the slider 31 below the support plate 32 on the side of the hot air nozzle 36, in such a way that it can be pressed downwardly in the direction 8 by way of a pressure cylinder 39 which is arranged above the pressure roller and which is fixed with four screws to the support plate 32. Viewing in the direction of displacement 20 the pressure roller 38 is disposed 'behind' the hot air nozzle 36 so that in operation the procedure first involves heating and thereafter applying pressure.

In addition, a circular blade 40 is pivoted rotatably on the side in opposite relationship to the pressure roller 38 with respect to the hot air nozzle 36, that is to say at left front on the support plate 32 in the view shown in FIG. 4. The circular blade 40 can cut off, beside the adhesive strip 29, the projecting part of the new rear material web 4. Upon the movement of the slider in the direction of displacement 20 towards front left in FIGS. 1 to 4, firstly the projecting portion is cut off and then the adhesive strip 29 is produced by heat and pressure.

In addition, mounted beside the circular blade 40 on the support plate 32 or the fixing plate portion 42 thereof is a guide element 41 which is curved in an approximately quarter-circle configuration. The guide element converges to a point towards the left in the direction of displacement 20 in such a way that it thickens rearwardly in a wedge shape. In that way the guide element 41 can lift the overlap of the new trailing material web 4 so that that overlap is cut off to a previously specified dimension by the rotating circular blade 40.

The welding unit 30 can be moved in the direction of displacement 20 relative to the transverse rail 28 by the displacement unit 43 (not identified in greater detail) in such a way that the circular blade 40, assisted by the guide element 41, the hot air nozzle 36 and the pressure roller 38 can come into operation to produce the adhesive strip 29.

To apply the pressure for glueing the material webs 3 and 4 along the adhesive strip 29 the pressure roller 38 can be moved and pressed by means of the pressure cylinder 39 against a rubber pressure member 50. The rubber pressure member 50 which is in the form of a bar can be composed of a plurality of elongate portions and can be fixed to the carrier plate 1 below the pressure roller 38 over the entire length of the unit 1 in the manner shown in FIG. 5. The view of the rubber pressure member fixing in the filling machine shows the pressure rail 44, having a groove 45 in which is inserted the fixing anchor (not referenced) of the rubber pressure member 50, and is thereafter fixed by applying the upper fixing rail 46 in recesses provided for that purpose, in the pressure rail 44. The rubber pressure member 50 is secured to prevent it from falling out, by way of the counterpart plate 47, by means of screws shown in FIG. 3. When the cross-sectional views of the rubber pressure member in FIGS. 5 to 8 are considered, it will be seen that the rubber pressure member 50 has, towards the open top side which carries the pressure, two roof-like inclined surfaces 51 and 62, namely the large inclined surface 51 and the small inclined surface 52 which is set at an angle $\beta$ of approximately 27° relative thereto. The two surfaces intersect at an upper straight ridge line 53 against which the pressure roller 38 would first roll without interposed material webs, without further measures according to the invention. The setting angle $\gamma$ shown in FIG. 8, also referred to as the contact angle of the rubber member, is preferably about 6°. It is therefore at that angle that the large inclined surface 51 is set relative to the base plane 54 of the anchorage base portion of the rubber pressure member 50. The setting angle $\beta$ of approximately 27° is the corresponding angle for the small inclined surface 52. In a preferred embodiment the overall width of the rubber pressure member 50 is 12 mm. Of that dimension, in a projection, when therefore viewing downwardly in FIG. 6, 10 mm is attributed to the large inclined surface and about 2 mm to the small inclined surface 52.

The use of the rubber pressure member 50 with the material webs 3 and 4 is shown in FIGS. 6 to 8 and is particularly clearly illustrated by the detail on an enlarged scale corresponding to the circle VIII in FIG. 7. That detail is reproduced in FIG. 8. Shown therein is the old, front, outgoing material web 3 with the inclined cut 16 at the rear end and the new, rear, incoming material web 4 laid thereover, without inclined cut. The cut angle $\delta$ of the inclined cut 16 can also be clearly seen once again in the view in FIG. 8. There reference numeral 48 moreover denotes the decorative side of the packaging material and reference 49 denotes the product side.

The position of the transverse edges 17 and 18 of the material web with respect to the rubber pressure member 50 and the pressure roller 38 is important for the quality of the adhesive strip 29 to be produced. Thus for example in a particularly preferred embodiment it has been found that the rearmost line 55 at the inclined cut 16 of the material web 3, in the above-described embodiment of the rubber pressure member 50 and the dimensions thereof, should be about 2 mm spaced from the ridge line 53. That spacing d can be clearly seen in FIG. 6. In the preferred and specific embodiment described herein d=2 mm.

FIGS. 9 and 10 diagrammatically show the old material web 3 and the new material web 4 as are disposed in mutually superposed relationship in FIG. 9 in the correct welding and decorative position with their transverse edges 17 and 18 and are then welded by the application of heat and pressure, as shown in FIG. 10, in such a way that, in particular at the adhesive strip 29, they provide a seal in relation to liquid which is above in FIG. 10 so that the material carries the decoration from below. In this preferred embodiment each of the material webs 3, 4 includes a central fibre layer, for example a paper layer 56. The respective top side 57 of the paper layer 56 is also provided with a polymer layer 58, like the top side 59 of the material web 4. This configuration provides on the inner product side an inner surface 19 in the case of the leading material web 3, in the same manner as an inner surface 60 in the case of the trailing material web 4. Applied on the opposite side, that is to say the outer surface 61 of the fibre layer 56, is a further polymer layer 62 whose outer surface 63 is liquid-tight outwardly. Also in the case of the other material web 4 a plastic layer 65 is applied on the outer surface 64 so that a liquid-tight surface 66 is formed. The trailing material web 4 is provided with a straight cut 67 without that fibre layer 56 being covered to prevent the ingress of a liquid.

The above-described apparatus for glueing two material webs 3 and 4 operates as follows. The old, front, outgoing material web 3 moves from right to left in the direction of travel 9 through the clamping and positioning unit 21. When the web is ended, it is stopped with the trailing transverse edge 17. A paper loop is drawn downstream of the clamping device 21 in order to provide for compensation in respect of the later displacement of the trailing transverse edge 17. The clamping and positioning unit 21 will clamp the material web underneath. The web 3 is clamped fast by the clamping cylinders 24 and the clamping beam 23. Thereafter the material web is clamped fast by the clamping bar 7 of the clamping device 5a, 5b.

The material web is cut with the cutting unit 11, with the blade 14, with the cutting unit 11 being exactly guided by means of the guide carriage and the guide rail 12.

Thereafter the clamping device 5 is opened.

The clamping cylinder 24 with the elongate holding bar 22 is displaced towards the right in the view in FIG. 3 by the displacement cylinders 26a, 26b by the clamping and positioning unit, until the web 3 provided with the inclined cut 16 has reached the correct position, namely the decoration or welding position. Thereafter the cut material web 3 is clamped fast in the welding position by the clamping device 5 by way of the clamping cylinder 6 and the clamping bar 7.

After the new, rear, incoming material web 4 has been oriented in relation to the old leading material web 3, the displacement unit 43 lowers the upper clamping bar 27 in the direction 8 so that the web 4 is clamped fast between the two clamping bars 27.

The two material webs 3 and 4 are now welded together by means of the welding unit 30. For that purpose the welding unit 30 is continuously moved in the direction of the arrow 20 (towards the left in FIG. 4) by means of the displacement unit 43. In that situation the guide element 41 lifts the overlap of the new material web 4. The overlap is cut off to a previously specified dimension with the rotating circular blade 40. The hot air nozzle 36 follows the circular blade 40 between the old web 3 and the new lifted web 4. The plastic layer is heated and caused to melt by means of the hot air nozzle 36. The two layers of material are then pressed against the rubber pressure member 50 with the pressure roller 38 and thereby welded and glued together.

Thereafter all clamping devices 5, 27 and 21 can be opened.

The clamping and positioning unit 21, like also the welding unit 30, are returned to their starting positions.

LIST OF REFERENCES

1 elongate carrier plate
2 base plate
3 material web
4 material web
5 clamping device
6 clamping cylinder
7 clamping bar
8 lifting direction
9 direction of travel
10 longitudinal centre line through the material webs 3, 4
11 cutting unit
12 guide carriage with guide rail
13 blade holder
14 blade
15 knob
16 inclined cut
17 transverse edge of the material web 3
18 transverse edge of the material web 4
19 inner surface of the material web 3
20 direction of displacement
21 clamping and positioning unit
22 elongate holding bar
23 clamping beam
24 clamping cylinder
25 guide carriage and guide rail
26a, 26b displacement cylinder for the clamping and positioning unit
27 rear clamping bars
28 transverse rail
29 adhesive strip
30 welding unit
31 slider
32 support plate
33 heating means
34 hot air element
35 transfer tube
36 hot air nozzle
37 temperature sensor
38 pressure roller
39 pressure cylinder
40 circular blade
41 guide element
42 fixing plate portion
43 displacement unit
44 pressure rail
45 groove
46 upper fixing rail
47 counterpart plate
48 decoration side
49 product side
50 rubber pressure member
51 large inclined surface
52 small inclined surface
53 ridge line
54 base plane
55 rearmost line
56 paper layer
57, 59 top side
58, 62 polymer layer
61, 63 outer surface
64 outer surface of the material web 4
65 plastic layer
66 surface
67 straight cut
$\alpha$, $\beta$, $\gamma$, $\delta$ setting angles
d spacing between rubber pressure member and ridge line

The invention claimed is:

1. An apparatus for glueing two webs of packaging material for the production of liquidtight packs, for liquid foods, wherein each web is covered at least at one side with a liquid-tight adhesive layer which can he activated by heat, comprising
   clamping means for clamping the material webs (3,4) fast,
   a cutting unit for applying an inclined cut extending substantially transversely with respect to the material web and
   a welding unit for applying heat and pressure for glueing the material webs along an adhesive strip, characterised in that the welding unit has a slider which is displaceable along a transverse rail substantially transversely with respect to the direction of travel of the material web and on which are arranged a heating means and therebehind in the direction of displacement a pressure roller, characterised in that a cutting blade is arranged on the side opposite to the pressure roller with respect to the heating means.

2. Apparatus according to claim 1 characterised in that arranged on the slider beside the pressure roller is a guide element for lifting a said material web along its transverse edge during the displacement of the slider.

3. Apparatus according to claim 1 characterised in that the heating means has a hot air element, a transfer tube and a hot air nozzle.

4. Apparatus according to claim 3, wherein the hot air nozzle is in the form of a wide slot nozzle.

5. Apparatus according to claim 1 characterised in that the welding unit and the transverse rail can be raised and lowered in the lifting direction substantially perpendicularly to the direction of travel of the material web and perpendicularly to the direction of displacement of the slider.

6. Apparatus according claim 1 characterised in that the clamping means comprises a first clamping bar fixed under the transverse rail and at a spacing therebeneath a second clamping bar.

7. Apparatus according to claim 1 characterised in that the pressure in the production of the adhesive strip is produced by the pressure roller and a rubber pressure member disposed in opposite relationship therewith, wherein the rubber pressure member is in the form of a bar which extends in parallel relationship with the transverse rail and which has inclined surfaces.

8. Apparatus according to claim 7 characterised in that the contact line of the pressure roller against the rubber pressure member is on an inclined surface.

9. Apparatus according to claim 1 characterised in that the clamping means for clamping the material webs fast have a front, a central and a rear clamping device, arranged in the direction of travel of the material web.

10. Apparatus according to claim 1 characterised in that the clamping bars extending in parallel relationship with the transverse rail of the welding unit and that both the transverse rail and the clamping bars are set at an angle ($\alpha$) relative to the direction of travel of the material webs within the range of 60° to 90°.

11. The apparatus of claim 10, wherein the angle ($\alpha$) is in the range of 70° to 80°.

12. The apparatus of claim 10, wherein the angle ($\alpha$) is 85°.

\* \* \* \* \*

UNITED STATES PATENT AND TRADEMARK OFFICE
CERTIFICATE OF CORRECTION

| | | |
|---|---|---|
| PATENT NO. | : 7,331,368 B2 | Page 1 of 1 |
| APPLICATION NO. | : 10/517233 | |
| DATED | : February 19, 2008 | |
| INVENTOR(S) | : Matthias Gajewski et al. | |

It is certified that error appears in the above-identified patent and that said Letters Patent is hereby corrected as shown below:

On the Title Page Item (22), change "PCT Filed Nov. 6, 2003" to --PCT Filed June 6, 2003--

Signed and Sealed this

Eighth Day of July, 2008

JON W. DUDAS
*Director of the United States Patent and Trademark Office*